(12) United States Patent
Kim et al.

(10) Patent No.: US 11,954,634 B2
(45) Date of Patent: Apr. 9, 2024

(54) METHOD AND SYSTEM FOR MANAGING DELIVERY ITEM IN ABSENCE OF RECIPIENT

(71) Applicant: WOOWA BROTHERS CO., LTD., Seoul (KR)

(72) Inventors: Myung Sik Kim, Suwon-si (KR); Jun Woo Kim, Yongin-si (KR)

(73) Assignee: WOOWA BROTHERS CO., LTD., Seoul (KR)

( * ) Notice: Subject to any disclaimer, the term of this patent is extended or adjusted under 35 U.S.C. 154(b) by 0 days.

(21) Appl. No.: 17/916,017

(22) PCT Filed: Mar. 22, 2021

(86) PCT No.: PCT/KR2021/003510
§ 371 (c)(1),
(2) Date: Sep. 29, 2022

(87) PCT Pub. No.: WO2021/201480
PCT Pub. Date: Oct. 7, 2021

(65) Prior Publication Data
US 2023/0162126 A1 May 25, 2023

(30) Foreign Application Priority Data

Mar. 31, 2020 (KR) .................. 10-2020-0039303
Jul. 21, 2020 (KR) .................. 10-2020-0090131

(51) Int. Cl.
| | | |
|---|---|---|
| G06Q 10/0832 | (2023.01) | |
| G06Q 10/0833 | (2023.01) | |
| G06Q 50/30 | (2012.01) | |

(52) U.S. Cl.
CPC ..... *G06Q 10/0832* (2013.01); *G06Q 10/0833* (2013.01); *G06Q 50/30* (2013.01)

(58) Field of Classification Search
CPC .......... G06Q 10/0832; G06Q 10/0833; G06Q 50/30; G06Q 50/28; A47G 2029/147
(Continued)

(56) References Cited

U.S. PATENT DOCUMENTS

2019/0012640 A1* 1/2019 Ferguson .............. B64C 39/024
2020/0016767 A1 1/2020 Song
(Continued)

FOREIGN PATENT DOCUMENTS

| KR | 10-2017-0074369 | 6/2017 |
| KR | 10-1829125 | 2/2018 |

(Continued)

OTHER PUBLICATIONS

Biasiotto, Marco, et al. "Thermal Management System for a thermally controlled food delivery electric vehicle integrating heat pump, cold storage unit, solar panels and PCT resistors." Proceedings of the Transport Research Arena Apr. 16-19, 2018. University of Sheffield. pp. 1-9. (Year: 2018).*

(Continued)

*Primary Examiner* — Jeff Zimmerman
*Assistant Examiner* — Hunter A Molnar
(74) *Attorney, Agent, or Firm* — H.C. Park & Associates, PLC

(57) ABSTRACT

A method for managing a delivery item in the absence of a recipient invention includes the operations in which a delivery item management system determines whether or not an unloading request has been made by a client terminal with respect to a delivery robot which has arrived at a place of delivery; and the delivery item management system enables the delivery robot to automatically unload a delivery item at the place of delivery, on the basis of the determination result.

3 Claims, 5 Drawing Sheets

(58) Field of Classification Search
USPC .......................................................... 705/332
See application file for complete search history.

(56) References Cited

U.S. PATENT DOCUMENTS

| | | | | |
|---|---|---|---|---|
| 2020/0074385 A1* | 3/2020 | Vangelov | ............... | G07C 5/006 |
| 2020/0143324 A1* | 5/2020 | Takebayashi | ........... | B60R 25/24 |
| 2021/0073715 A1* | 3/2021 | Yamada | ................. | G06Q 10/08 |
| 2021/0280074 A1* | 9/2021 | Ali | ......................... | G06F 21/64 |

FOREIGN PATENT DOCUMENTS

| | | | | |
|---|---|---|---|---|
| KR | 10-2018-0039437 | | 4/2018 | |
| KR | 10-2019-0104483 | | 9/2019 | |
| KR | 10-2088415 | | 3/2020 | |
| WO | WO-2017210404 A1 * | 12/2017 | ......... B60H 1/00014 |

OTHER PUBLICATIONS

Lee, S. and Kwon, Y. (2019) Development of Drone Cargo Bay with Real-Time Temperature Control. World Journal of Engineering and Technology, 7, pp. 612-621. doi: 10.4236/wjet.2019.74044. (Year: 2019).*

Written Opinion of International Searching Authority dated Jul. 19, 2021 for International Patent Application No. PCT/KR2021/003510.

International Search Report dated Jul. 19, 2021 in International Application No. PCT/KR2021/003510 (with English Translation).

* cited by examiner

METHOD AND SYSTEM FOR MANAGING DELIVERY ITEM IN ABSENCE OF RECIPIENT

CROSS REFERENCE TO RELATED APPLICATION

This application is a National Stage Entry of International Application No. PCT/KR2021/003510, filed Mar. 22, 2021, which claims priority to and the benefit of Korean Patent Application No. 10-2020-0039303, filed Mar. 31, 2020 and Korean Patent Application No. 10-2020-0090131, filed Jul. 21, 2020, each of which is hereby incorporated by reference for all purposes as if fully set forth herein.

BACKGROUND

Field

Embodiments of the invention relates generally to a method and system for managing a delivery item in the absence of a recipient, and more particularly, to a technical idea which enables, in a delivery system using a delivery robot, placement of a delivery item at a predetermined place with the consent of a customer in the absence of the recipient (customer) to receive the delivery item.

Discussion of the Background

With difficulties in recruiting and managing manpower as well as rising labor costs and increased preference for contact-free services, there is an increase in demand for delivery using delivery robots instead of human.

However, in the absence of a customer (recipient) upon arrival at a place of delivery, the delivery robot has difficulty in managing the situation promptly and flexibly unlike the conventional delivery man (human). In a situation of standing by until the customer arrives, there may be an issue concerning deterioration of quality of delivery items depending on the type thereof (e.g., food). Moreover, the prolonged standby of the delivery robot at one place of delivery may cause interruption with other delivery.

In addition, not even in the absence of the customer, there is a growing demand of customers wanting the delivery item to be left in a predetermined place, such as in front of the door or in the hallway, rather than direct reception of the delivery item by walking out of the door.

The conventional delivery man for direct delivery barely encounters such situations. However, there may be various issues that the delivery robot may cope with, concerning selection of an appropriate location to unload the delivery item as well as placement of the delivery item with no damage.

Therefore, a technical idea is desired that enables the delivery robot to automatically perform stable unloading of the delivery item on a correct place as the conventional delivery man does even in the absence of the recipient.

(Patent Document 1) Korean Patent (Registration No. 10-2015994, "Loading box for preventing decrease in ascon temperature")

The above information disclosed in this Background section is only for understanding of the background of the inventive concepts, and, therefore, it may contain information that does not constitute prior art.

SUMMARY

An object to be addressed by the present disclosure is to provide a technical idea that enables a delivery robot to stably unload a delivery item at a correct place even in the absence of a recipient.

Additional features of the inventive concepts will be set forth in the description which follows, and in part will be apparent from the description, or may be learned by practice of the inventive concepts.

A method of managing a delivery item in the absence of a recipient according to an example embodiment for addressing the technical issues includes checking, by a delivery item management system, whether there is an unloading request from a customer terminal for a delivery robot arriving at a place of delivery, and controlling, by the delivery item management system, the delivery robot to automatically unload a delivery item at the place of delivery based on a result of checking, wherein the controlling of the delivery robot to automatically unload the delivery item at the place of delivery may include, if there is the unloading request, controlling, by the delivery item management system, the delivery robot to automatically unload the delivery item at the place of delivery, or if there is no unloading request, controlling, by the delivery item management system, the delivery robot to stand by at the place of delivery, and when no communication with the customer terminal is performed for a predetermined period of time during the standby, controlling the delivery robot to automatically unload the delivery item at the place of delivery.

In addition, the method of managing a delivery item in the absence of a recipient may further include, when an unloading place is designated from the customer terminal, determining, by the delivery item management system, the designated place as the unloading place, and when no unloading place is designated from the customer terminal, determining, by the delivery item management system, an arbitrary place within the place of delivery as the unloading place.

In addition, the determining, by the delivery item management system, of the designated place as the unloading place may include photographing, by the delivery item management system, the place of delivery within a predetermined range through at least one camera provided in the delivery robot, transmitting photograph data obtained by the photographing to the customer terminal, receiving, by the delivery item management system, designation of an unloading place in the photograph data from the customer terminal, and matching, by delivery item management system, the unloading place designated in the photograph data with a place in an actual place of delivery and determining the matched place as the unloading place.

In addition, the method of managing a delivery item in the absence of a recipient may further include photographing, by the delivery item management system, the place of delivery in which the unloaded delivery item is included through at least one camera provided in the delivery robot, and transmitting photograph data obtained by the photographing to the customer terminal.

The method of managing a delivery item in the absence of a recipient may be implemented by a computer program installed in a data processing apparatus.

A system for managing a delivery item in the absence of a recipient according to an example embodiment for addressing the technical issues includes a communication part configured to perform communication with the customer terminal, a photograph data acquisition part configured to acquire photograph data taken by at least one camera provided in a delivery robot, and a controller configured to control a function of the delivery robot, wherein the controller is configured to check, when the delivery robot arrives at the place of delivery, whether there is an unloading request from the customer terminal, control, if there is the unloading request, the delivery robot to automatically unload the delivery item at the place of delivery, control, if there is no unloading request, the delivery robot to stand by at the place of delivery and control, when no communication with the customer terminal is performed for a predetermined period of time during the standby, the delivery robot to automatically unload the delivery item at the place of delivery, and when the delivery item is unloaded, control the communication part to acquire the photograph data obtained by photographing the place of delivery in which the unloaded delivery item is included through the photograph data acquisition part to transmit the photograph data to the customer terminal.

In addition, the controller may be configured to check whether there is designation of an unloading place from the customer terminal, and control, based on a result of checking, the delivery robot to automatically unload the delivery item at the designated unloading place or an arbitrary place within the place of delivery.

In addition, the system for managing a delivery item may further include an image converter configured to perform a predetermined image processing on the photograph data and a location extractor configured to extract an unloading place from the predetermined image, and may be configured to receive an image in which an unloading place is designated from the customer terminal receiving the photograph data in which the place of delivery is photographed, and extract the designated unloading place form the received image to match the same with a place in an actual place of delivery and control to unload the delivery item at the matched place.

According to an example embodiment of the present disclosure, by enabling stable unloading of delivery items in the absence of a recipient even in the delivery using a delivery robot, it is possible to shorten the standby time of the delivery robot to run on smooth delivery schedule. In addition, in the absence of the recipient, the delivery robot returns without unloading the delivery item to prevent dissatisfaction due to no reception of the delivery item that the recipient already paid for, thereby providing a high-satisfaction delivery service.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1:
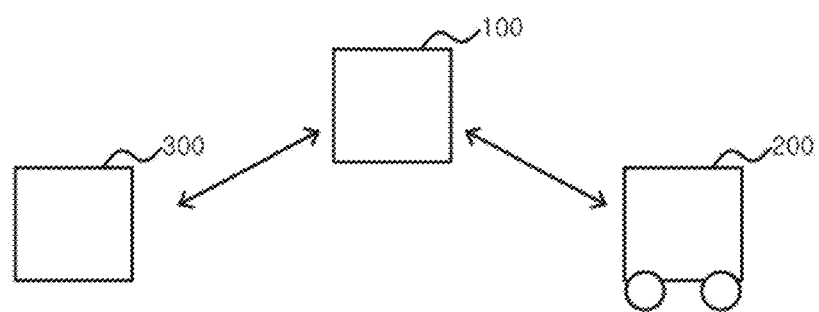
FIG. 1 illustrates a schematic configuration of a system for implementing a method of managing a delivery item in the absence of a recipient according to an example embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z—axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Because the inventive concepts may be implemented in various forms and may have various example embodiments, specific example embodiments are illustrated in the drawings and described in detail. However, this is not intended to limit the present disclosure to specific example embodiments, and should be understood to include all modifications, equivalents, and substitutes included in the spirit and scope of the present disclosure. In describing the present disclosure, if it is determined that a detailed description of a related known technology may obscure the gist of the present disclosure, the detailed description thereof will be omitted.

Terms such as first, second, and the like may be used to explain various components, but the components should not be limited to the terms. The terms are used only to distinguishing one component from another component.

Terms used in the present application are only used to describe specific example embodiments, and are not intended to limit the present disclosure. The singular forms are intended to include the plural forms unless the context clearly dictates otherwise.

The terms such as "comprise" or "have," when used in this specification, are intended to specify the presence of stated features, integers, steps, operations, elements, components, or a combination thereof, but do not preclude the presence or addition of one or more features, integers, steps, operations, elements, components, and/or groups thereof.

In addition, in this specification, when any one component 'transmits' data to another component, this means that the component may transmit the data to the other component directly or through at least one other component. Conversely, when one component 'directly transmits' data to another component, it means that the data is transmitted from the component to the other component without passing through still other component.

Figure 2:
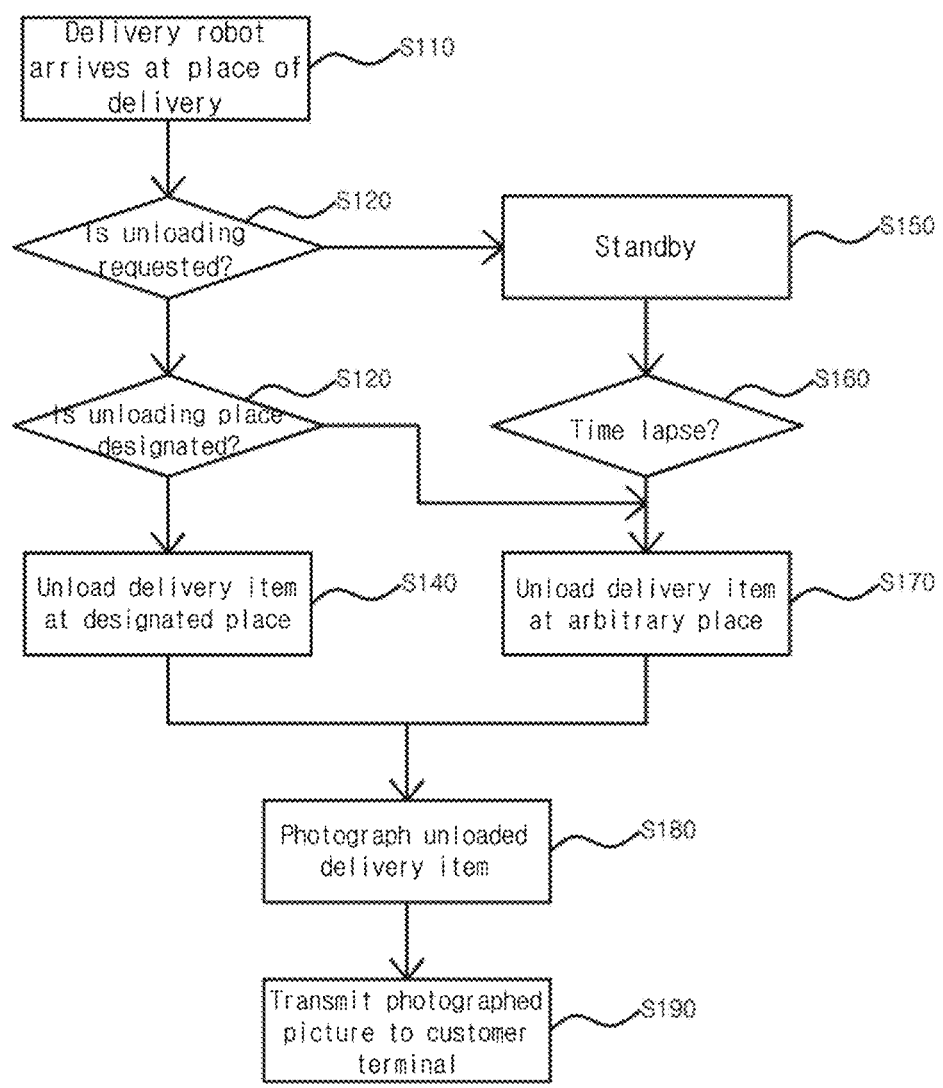
FIG. 2 illustrates a schematic flow of a method of managing a delivery item in the absence of a recipient according to an example embodiment.
Figure 3:
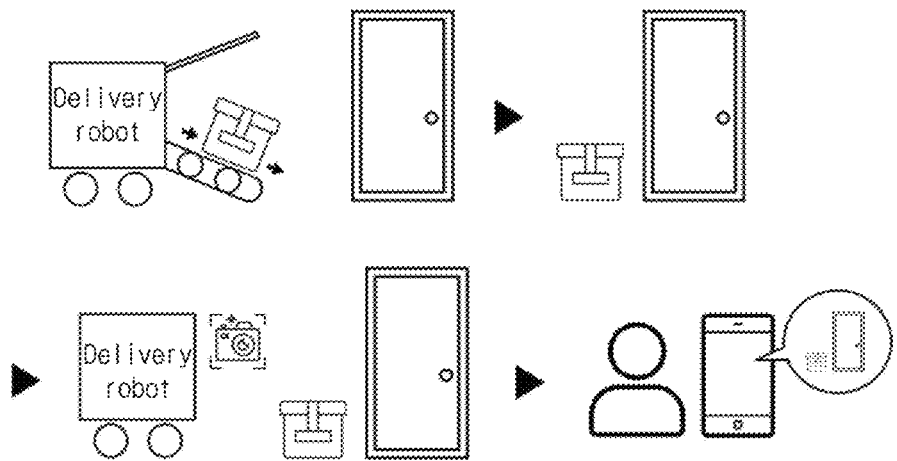
FIG. 3 is a diagram illustrating a method of managing a delivery item in the absence of a recipient according to an example embodiment.

FIG. 1 illustrates a schematic configuration of a system for implementing a method of managing a delivery item in the absence of a recipient according to an example embodiment, FIG. 2 illustrates a schematic flow of the method of managing a delivery item in the absence of a recipient according to an example embodiment, and FIG. 3 is a diagram illustrating the method of managing a delivery item in the absence of a recipient according to an example embodiment.

First, referring to FIG. 1, a system for managing a delivery item in the absence of a recipient 100 (hereinafter, referred to as a delivery item management system) according to an example embodiment is configured to perform communication with a customer terminal 300 and control operations and functions of a delivery robot 200.

According to an example embodiment, the delivery item management system 100 may be implemented as a control system to control the operation of the delivery robot 200 by being provided in the delivery robot 200.

According to an example embodiment, it may be implemented as a predetermined management system operated by a management entity that manages the delivery robot 200 separately from the delivery robot 200. In this case, the technical idea of the present disclosure may be embodied as the delivery item management system 100 is implemented in the form of a predetermined server to transmit and receive predetermined data while performing communication with the delivery robot 200 and/or the customer terminal 300 through a network. According to another example embodiment, a part of the configuration of the delivery item management system 100 is included in a predetermined server, and the remaining part of the configuration may be distributedly installed in the delivery robot 200. That is, in the drawing, the delivery item management system 100 is illustrated as a single physical configuration separated from the delivery robot 200. However, depending on example embodiments, the configurations of the delivery item management system 100 may implement the technical idea of the present disclosure as a plurality of physical devices is organically combined through a wired/wireless network.

Hereinafter, mainly described as a case is the delivery item management system 100 that is provided in the delivery robot 200 and implemented as a predetermined control system configured to control the operation of the delivery robot 200, but the rights of the present disclosure is not necessarily limited thereto.

The delivery item management system 100 may be configured to check unloading requests of a customer (recipient) through a unloading request signal input through a predetermined GUI menu provided in the customer terminal 300, order information transmitted from the customer terminal 300, and/or voice information in the call for delivery request (order). Hereinafter, the term unloading request as used herein may refer to a case that the recipient requests unloading of the delivery item at a place of delivery without directly receiving the delivery item from the delivery robot 200. For example, the unloading request may be a request such as "Put the delivery item at the door and call me." Such unloading request may be requested directly by the recipient when the recipient is absent at an expected arrival time when the delivery robot arrives at the place of delivery, or when the recipient wants non-face-to-face reception due to unwillingness to directly face not only a delivery man but also the delivery robot 200.

According to an example embodiment, even with no particular unloading request from the recipient, if the recipient does not receive the delivery item or is not reached until a predetermined time elapses after the delivery robot 200 arrives at the place of delivery, the delivery item management system 100 may have the delivery item that the delivery robot 200 is loading automatically unloaded. In this case, the delivery item management system 100 may determine that the recipient is absent according to a specific condition, and have the delivery item unloaded at the place of delivery in the same way as the unloading request is received. The specific condition may be, for example, a case in which a predetermined time elapses without being reached with the recipient after the delivery robot 200 arrives at the place of delivery.

Meanwhile, in the specification, for convenience of explanation, mainly described is the case that the delivery item is food, but is not necessarily limited thereto. In addition, it may be easily inferred, by an average expert in the technical field to which the present disclosure pertains, that technical idea of the present disclosure may be applied to all items that may be delivered by the delivery robot 200, such as small parcel delivery.

FIG. 2 is a schematic flow illustrating a method of managing a delivery item in the absence of a recipient according to an example embodiment, and FIG. 3 is a diagram illustrating the method of managing a delivery item in the absence of a recipient according to an example embodiment.

Referring to FIGS. 2 and 3, the delivery item management system 100 may determine whether there is an unloading request from the customer terminal 300 of the recipient (s120) after the delivery robot 200 arrives at the place of delivery (s110).

If there is an unloading request from the recipient, the delivery item management system 100 may determine whether there is an unloading place designated by the recipient (s130).

In this case, when the unloading place is designated, the delivery item management system 100 may control the delivery robot 200 to unload the delivery item at the designated unloading place (s140).

When the unloading place is not designated, the delivery item management system 100 may control the delivery robot 200 to unload the delivery item at an arbitrary place at the place of delivery (s170).

If there is no unloading request from the recipient in operation (s120), the delivery item management system 100 may control the delivery robot 200 to stand by for a predetermined time at the place of delivery (s150). When a predetermined time elapses after the delivery robot 200 stands by (s160), the delivery item management system 100 may determine that the recipient is absent and control the delivery robot 200 to unload the delivery item at an arbitrary place in the place of delivery (s170).

In any case, once the delivery robot 200 unloads the delivery item at the place of delivery, the delivery item management system 100 may control the delivery robot 200 to photograph the delivery item unloaded at the place of delivery (s180). In addition, a taken picture (or video) of the delivery item may be transmitted to the customer terminal 300 (s190). Hereinafter, a picture or video taken by the delivery robot 200 is referred to as photograph data. The photograph data of the delivery item may be directly transmitted to the customer terminal 300 by the delivery robot 200 or transmitted to the customer terminal 300 through the delivery item management system 100.

Then, the recipient may check the transmitted photograph data through one's own customer terminal 300.

According to an example embodiment, the delivery item management system 100 may undergo, on the photograph data taken by the camera provided in the delivery robot 200, processes such as a predetermined image or video processing/synthesis process and provide the photograph data that may be changed to various viewpoints such as a top view or a bird's eye view to the customer terminal 300. In this case, the delivery robot 200 may be provided with a plurality of cameras configured to photograph in different directions.

In this way, when photographed by the delivery robot 200, there may be a security advantage compared to the conventional shooting using a personal cell phone of a delivery man. Even on the customer's side, it would bring a sense of security compared to a case of being aware that someone who is not familiar with possesses a picture taken around the house of the customer as the delivery man personally photographs the front of the house.

In addition, according to an example embodiment, information on the delivery status of the delivery robot 200 and/or status information on the delivery item may be provided to the recipient through the customer terminal 300.

Information on the delivery status may include, for example, time information such as the time when the delivery robot 200 arrives at the place of delivery, the standby time after the arrival, the time when the delivery item is unloaded after the standby, or the final return time of the delivery robot 200 and/or the photograph data acquired after the delivery robot 200 arrives at the place of delivery and photographs the place of delivery.

Provided to the recipient may be the status information on the delivery item, such as the temperature of the delivery item (e.g., the temperature of food when the delivery item is food) or the packaging status at the time when the delivery robot 200 unloads the delivery item.

According to the technical idea of the present disclosure, even if the recipient is absent or wants non-face-to-face reception in the delivery service using the delivery robot 200 as described above, the same or more information as the service provided by the conventional delivery man may be provided to the recipient.

On the other hand, according to the technical idea of the present disclosure, it is possible to provide improved convenience to the recipient by allowing the recipient to designate, as the desired place, the place where the delivery item is to be unloaded at the place of delivery. This will be described with reference to FIG. 4.

Figure 4:
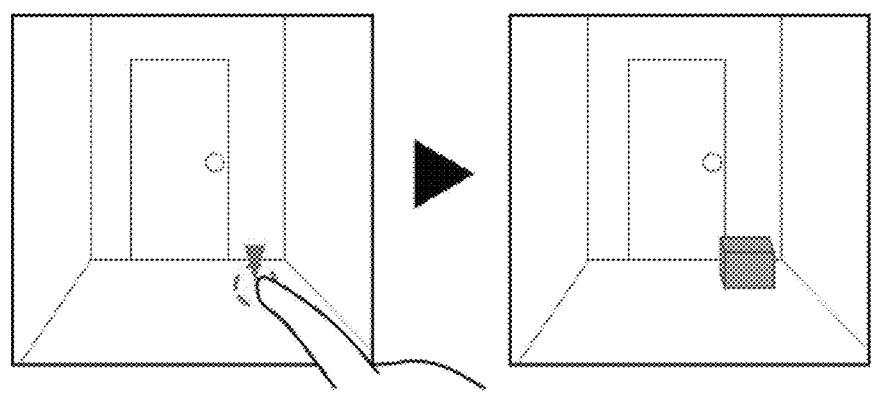
FIG. 4 is a diagram illustrating designation of an unloading place according to a method of managing a delivery item in the absence of a recipient according to an example embodiment.

FIG. 4 is a diagram illustrating designation of an unloading place according to the method of managing a delivery item in the absence of a recipient according to an example embodiment.

Referring to FIG. 4, the delivery item management system 100 according to an example embodiment of the present disclosure may be implemented to allow the recipient (customer) to directly designate an unloading place of the delivery item.

According to an example embodiment, before unloading the delivery item after the delivery robot 200 arrives at the place of delivery, the photograph data in which the place of delivery is photographed may be transmitted to the customer terminal 300. Then, as illustrated in the drawing, the recipient may directly select and designate an unloading place from the photograph data received through one's own customer terminal 300.

If a video is transmitted to the customer terminal 300, that is, if the photograph data is a video, the transmitted video may be a real-time video being photographed by the delivery robot 200. In this case, the recipient may check the arrival of the delivery robot 200, the movement route, or the unloading status at the place of delivery in real time.

As such, the photograph data taken by the delivery robot 200 may be provided at various viewpoints through predetermined processing processes as described above. For example, the photograph data provided to the recipient through the customer terminal 300 may simply be a point of time being photographed by any one camera provided in the delivery robot 200. However, when a plurality of cameras photographing each different direction are provided in the delivery robot 200, the photograph data taken by each camera may be provided after being changed to various viewpoints such as a top view and a bird's eye view by undergoing processes such as predetermined image or video processing/compositing processes.

Here, the unloading place designated in the customer terminal 300 by the recipient may be displayed on the 2D image. In the case of a general 2D image, more accurate unloading place may be extracted from the 2D image owing to an embedded 2D to 3D conversion parameter standardized to the delivery robot camera. Because the synthesis and processing methods configured to change the viewpoint of such photograph data, and the technical idea to extract a 3D position from a 2D image are widely known, a detailed description thereof will be omitted herein.

When the unloading place is designated by the recipient, the previously designated place may be stored as a default unloading place in the same place of delivery thereafter, unless the unloading place is re-designated by the recipient before unloading is completed.

If the unloading place is not designated by the recipient, the delivery robot 200 may set an arbitrary place in the place of delivery as the unloading place. The arbitrary place may be designated within a range that is not deviated from a predetermined range in the place of delivery.

In this case, the delivery item management system 100 may extract a location where the unloading of the delivery item is easy from the photograph data for the place of delivery photographed by the delivery robot 200, and designate the extracted place as the unloading place.

Alternately, if the unloading place is not designated by the recipient, the default place (e.g., the door opening direction based on a door handle, the left/right/front of the door, etc.) preset according to a predetermined condition may be designated as the unloading place so as to unload the delivery item.

On the other hand, when automatically unloading the delivery item by the delivery robot 200, unlike the conventional delivery man, stable unloading of the delivery item may be important. The technical idea therefor will be described with reference to FIGS. 5 to 8.

Figure 5:
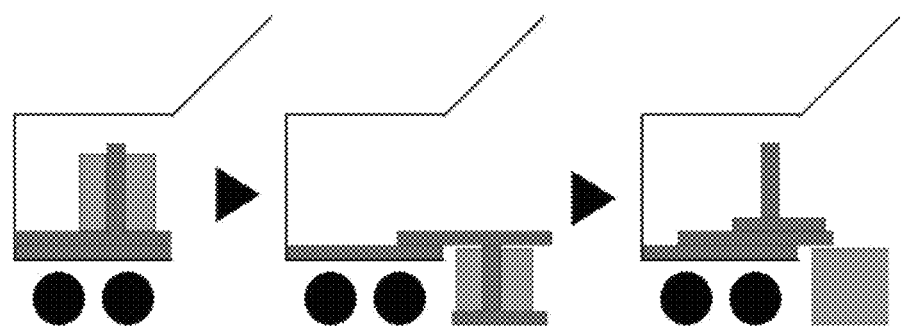
FIGS. 5 and 6 are diagrams illustrating an unloading system of a delivery robot according to a method of managing a delivery item in the absence of a recipient according to an example embodiment.
Figure 6:
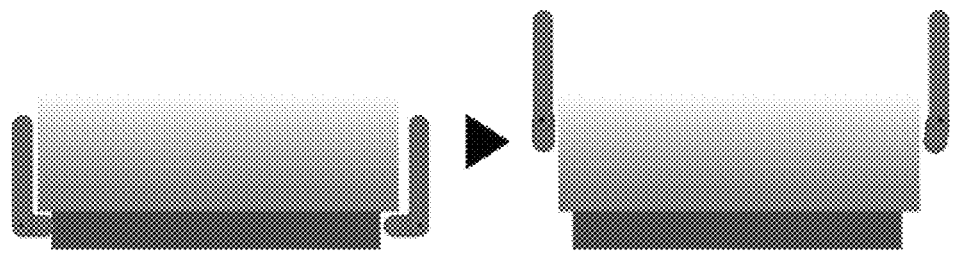

FIGS. 5 and 6 are diagrams illustrating an unloading system of a delivery robot according to the method of managing a delivery item in the absence of a recipient according to an example embodiment.

Referring to FIGS. 5 and 6, the delivery item management system 100 according to an example embodiment of the present disclosure may embed a predetermined elevation apparatus in the delivery robot 200.

Various methods for the delivery robot 200 to unload the delivery item may be applied. According to one example, as illustrated in FIG. 3, a conveyor belt may be provided inside a loading box to unload the delivery item from the delivery robot 200. In this case, in order to minimize the impact during unloading, the conveyor belt moves, the distance/height to the ground is adjusted to a certain level, and then the delivery item may be transferred to the ground by the conveyor belt.

However, in this case, there may be an issue concerning the probability that impact may be generated when the delivery item being transferred along the conveyor belt touches the ground.

However, in that case, as will be described later, the typical type of packaging (e.g., plastic bags, paper bags, packaging boxes, plastic packaging materials, etc.) or small parcel delivery (e.g., document bags, postal mails, etc.) may be automatically unloaded regardless of the shape or packaging material of the delivery item without having packaging of a predetermined type of delivery item packaging or additional devices configured to grip the delivery item.

On the other hand, in the case of having an elevation apparatus capable of stably gripping the delivery item and placing the same onto the ground, the impact generated upon unloading may be minimized by the elevation apparatus while the effect of performing more stable unloading is secured. To this end, however, packaging of the delivery item or an additional configuration for the elevation apparatus for stable gripping/transportation is desired, so that there may be an issue concerning the double packaging made on the delivery item or the cost increase.

When the elevation device is provided as illustrated in FIG. 5, the packaging of the delivery item may be prepared in the form of a pallet, and a dedicated mechanism configured to transport the pallet may be provided in the elevation apparatus.

Alternatively, for stable gripping of the delivery item, the packaging of the delivery item may be formed in a shape corresponding to the elevation apparatus. For example, as illustrated in FIG. 6, a groove may be formed at a predetermined spot on the packaging of the delivery item, and a gripper corresponding to the groove formed in the elevation apparatus may be formed to perform unloading tasks by stably gripping the delivery item.

Various methods may be applied as described above to unload the delivery item from the delivery robot 200, each of which may have different advantages and disadvantages. Therefore, a delivery service using the delivery robot 200 may be provided by selecting a suitable type of unloading method as desired.

Meanwhile, according to another example embodiment of the present disclosure, the recipient may prepare a dedicated storage box for the delivery robot 200 at the place of delivery. The case is illustrated in FIGS. 7 to 8.

Figure 7:
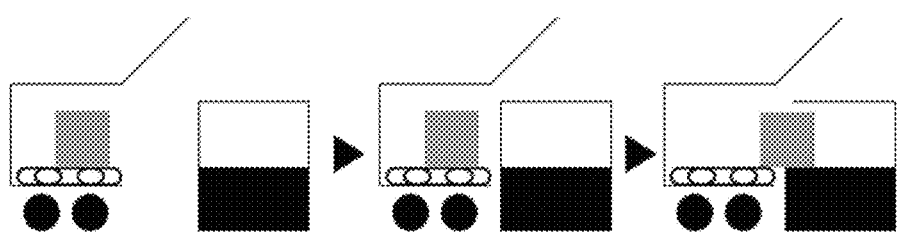
FIGS. 7 and 8 are diagrams illustrating an unloading system of a delivery robot according to an example embodiment.
Figure 8:
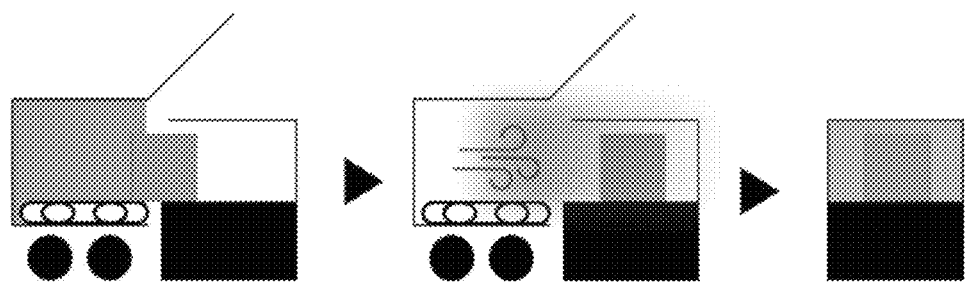

FIGS. 7 and 8 are diagrams illustrating an unloading system of a delivery robot according to an example embodiment.

Referring to FIGS. 7 and 8, a separate dedicated storage box may be provided, in which the delivery item unloaded from the delivery robot 200 may be placed.

Although such the dedicated storage box causes inconvenience to separately prepare at the place of delivery, it may be usefully applied when loading is difficult due to a height difference or concerning about a change in the quality of the delivery item, such as food. The dedicated storage box may be formed to be suitable for unloading by the delivery robot 200, unlike a general delivery box or mailbox.

Therefore, the delivery item management system 100 may be aware of whether the dedicated storage box is provided at the place of delivery. When it comes to preparation of the dedicated storage box, the preparation of the dedicated storage box at the place of delivery may be stored upon initial installation of the dedicated storage box. Or, the preparation of the dedicated storage box may be identified when the delivery is carried out at least once by the delivery robot 200 and then the preparation thereof may be identified subsequently.

In the place of delivery where it is checked that the dedicated storage box is prepared, if there is an unloading request from the recipient or when it is desired to unload the delivery item in the absence of the recipient, the delivery robot 200 may be controlled to unload the delivery item to the dedicated storage box unless a separate unloading place is designated.

The dedicated storage box may be formed to have a height corresponding to that of the delivery item transferred from the loading box of the delivery robot 200. For example, the entrance of the loading box of the delivery robot 200 and the entrance of the dedicated storage box may be formed to have the same or similar height.

As such, when the dedicated storage box is provided, the dedicated storage box may include a temperature control function for keeping warm/cooling inside, or the material of the dedicated storage box itself may be formed of an insulating material capable of performing a warming function.

According to an example, by connecting power to the dedicated storage box, it is possible to drive a device for temperature control, such as a heater and a cooler provided in the dedicated storage box. In this case, the dedicated storage box may receive information on the delivery item (e.g., food) delivered from the delivery robot for preparation by pre-regulating the temperature inside the dedicated storage box to correspond to the delivery item. For example, in the case of hot food, the internal temperature of the dedicated storage box may be kept higher than a certain level, and in the case of cold food, the temperature may be kept lower than a certain level. In this case, the quality of the delivery item may be maintained for a considerable amount of time even if the absent time of the recipient is prolonged to some extent.

Alternately, as illustrated in FIG. 8, when the delivery item from the delivery robot 200 is placed in the dedicated storage box, it is possible to more easily control internal temperature of the dedicated storage box by supplying air inside the loading box of the delivery robot 200 into the dedicated storage box. For example, the temperature inside the loading box of the delivery robot 200 having loaded hot food inside the sealed loading box may have a higher temperature than room temperature. Therefore, if such high-temperature air is supplied together when the delivery item is placed in the dedicated storage box, the internal temperature of the dedicated storage box may be increased relatively quickly.

Such the dedicated storage box may perform, after the customer (recipient) picks up the placed delivery item, functions of reducing the fluctuation in internal temperature through various methods such as generating wind therein or removing the odor inside the dedicated storage box.

Figure 9:
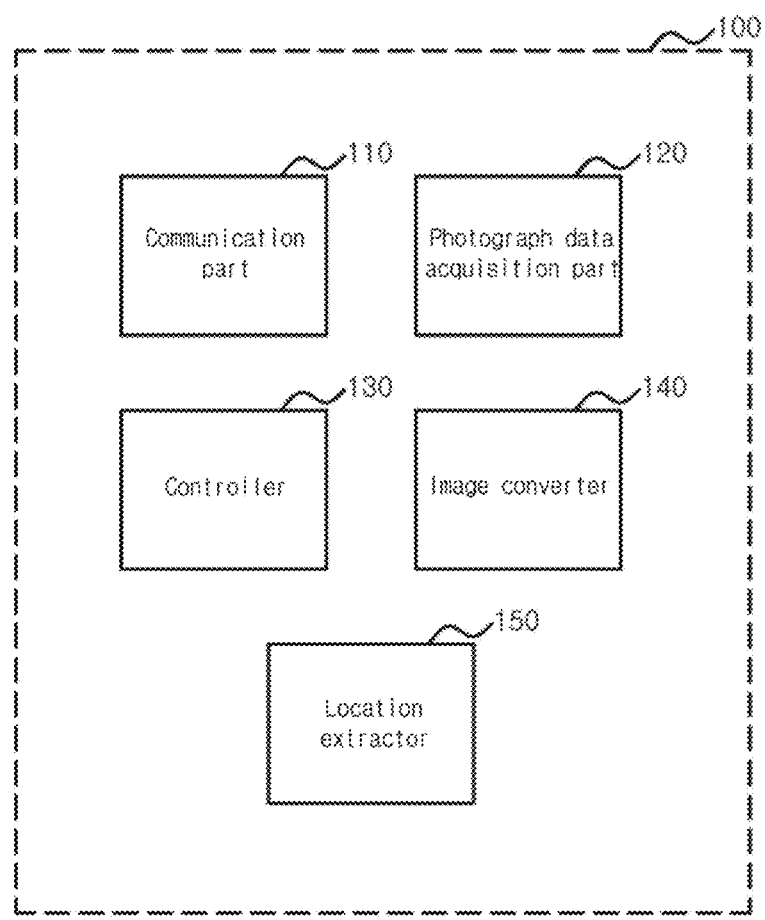
FIG. 9 illustrates a schematic configuration of a system for managing a delivery item in the absence of a recipient according to an example embodiment.

FIG. 9 illustrates a schematic configuration of a system configured to manage a delivery item in the absence of a recipient according to an example embodiment.

Referring to FIG. 9, the delivery item management system 100 according to an example embodiment of the present disclosure includes a communication part 110 configured to perform communication with the customer terminal, a photograph data acquisition part 120 configured to acquire photograph data taken by at least one camera provided in the delivery robot, and a controller configured to control the function of the delivery robot 200. According to an example embodiment, the delivery item management system 100 may further include an image converter 140 configured to perform predetermined image processing on the photograph data, and/or a location extractor 150 configured to extract an unloading place from a predetermined image.

First, the controller 130 may be installed in the delivery robot 200 and configured to perform a function of controlling calculations and other configurations for implementing the technical idea of the present disclosure. The controller 130 may include a processor, a storage device, and a program stored in the storage device and executed by the processor. As used herein, that the delivery robot and/or the controller 130 perform a predetermined operation may be easily inferred by an average expert in the technical field of the present disclosure that the processor may execute the program to be performed by a series of data processing and/or control.

The communication part 110 may be configured to transmit and receive various information, signals, data, etc. used for implementing the technical idea of the present disclosure while performing communication with the customer terminal 300. For example, the communication part 110 and the customer terminal 300 may be configured to perform communication through a long-distance wireless communication method such as 3G, LTE, LTE-A, Wi-Fi, WiGig, Ultra Wide Band (UWB) or a short-range wireless communication method such as MST, Bluetooth, NFC, RFID, ZigBee, Z-Wave, and IR, transmit and receive voice calls, text messages, push messages, etc., or transmit and receive a predetermined image and/or video.

In another embodiment, the communication part 110 and the customer terminal 300 may be configured to communicate with each other via a predetermined relay server. In this case, the communication part 100 and the relay server as well as the customer terminal 300 and the relay server may be configured to communicate via the above-described wireless communication method.

The photograph data acquisition part 120 may be configured to acquire photograph data taken by at least one camera provided in the delivery robot 200 as described above.

The photograph data acquired thereby may be converted into an image that a viewpoint may be converted through the image converter 140 so as to be provided to the customer terminal 300.

As described above, when the recipient designates the unloading place through the customer terminal 300 in the photograph data in which the place of delivery is photographed, the location extractor 150 may be configured to receive an image in which the unloading place is designated and extract the designated unloading place. By matching the same with a place in an actual place of delivery, the delivery robot 200 may extract an actual place to unload the delivery item.

Meanwhile, the controller 130 may be configured to check, when the delivery robot 200 arrives at the place of delivery, whether there is an unloading request from the customer terminal 300.

As a result of checking, if there is an unloading request, the controller 130 may be configured to control the delivery robot 200 to automatically unload the delivery item at the place of delivery.

In addition, when there is no unloading request, the controller 130 may be configured to control the delivery robot 200 to stand by at the place of delivery, and when communication with the customer terminal 300 is not performed for a certain period of time during the standby, the delivery robot 200 may be controlled to automatically unload the delivery item at the place of delivery.

In addition, when the delivery item is unloaded, the controller 130 may be configured to control the communication part 110 to acquire the photograph data in which the place of delivery is photographed including the unloaded delivery item through the photograph data acquisition part and transmit the photograph data to the customer terminal 300.

Further, the controller 130 may be configured to check whether there is unloading place designation from the customer terminal from the location extractor 150, and control the delivery robot 200 to automatically unload the delivery item at a designated unloading place or any place within the place of delivery based on the result of checking.

To this end, the controller 130 may be configured to receive, through the communication part 110, an unloading place-designated image from the customer terminal 300 receiving the photograph data in which the place of delivery is photographed. In addition, when the designated unloading place is extracted from the image received by the location extractor 150 and then is matched with the place in the actual place of delivery, the controller 130 may be configured to control the delivery robot 200 to unload the delivery item at the matched place.

The foregoing description of the present disclosure is for illustration, and those skilled in the art to which the present disclosure pertains can understand that modifications into other specific forms may be easily made without changing the technical spirit or essential features of the present disclosure. Therefore, it should be understood that the example embodiments described above are illustrative in all respects and not restrictive. For example, each component described as a single type may be implemented in a distributed manner, and components described as distributed may be implemented in a combined form.

The scope of the present disclosure is indicated by the appended claims rather than the above detailed description, and all changes or modifications derived from the meaning and scope of the claims and their equivalent concepts should be construed as being included in the scope of the present disclosure.

The present disclosure may be used for a method and system for managing a delivery item in the absence of a recipient.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

The invention claimed is:

1. A method of managing a delivery item in the absence of a recipient, the method comprising:

checking, by a delivery item management system, whether there is an unloading request from a customer terminal for a delivery robot arriving at a place of delivery; and controlling, by the delivery item management system, the delivery robot to automatically unload the delivery item at the place of delivery based on a result of checking, wherein:

the controlling of the delivery robot to automatically unload the delivery item at the place of delivery comprises, if a dedicated storage box is provided at the place of delivery, controlling, by the delivery item management system, the delivery robot to automatically unload the delivery item at the dedicated storage box;

the dedicated storage box receives information on the delivery item delivered from the delivery robot for preparation by pre-regulating the temperature inside the dedicated storage box to correspond to the delivery item; and when the delivery robot automatically unloads the delivery item at the dedicated storage box, the delivery robot supplies air inside a loading box of the delivery robot into the dedicated storage box.

2. A recorded computer program installed in a data processing apparatus and recorded in a non-transitory recording medium for performing the method according to claim 1.

3. A system for managing a delivery item, the system comprising:

a communication part configured to perform communication with the customer terminal;

a photograph data acquisition part configured to acquire photograph data taken by at least one camera provided in a delivery robot; and a controller configured to control a function of the delivery robot, wherein:

the controller is configured to:

check, when the delivery robot arrives at the place of delivery, whether there is an unloading request from the customer terminal; and control, if there is the unloading request, the delivery robot to automatically unload the delivery item at the place of delivery;

if a dedicated storage box is provided at the place of delivery, controlling, by the delivery item management system, the delivery robot to automatically unload the delivery item at the dedicated storage box;

the dedicated storage box receives information on the delivery item delivered from the delivery robot for preparation by pre-regulating the temperature inside the dedicated storage box to correspond to the delivery item; and when the delivery robot automatically unloads the delivery item at the dedicated storage box, the delivery robot supplies air inside a loading box of the delivery robot into the dedicated storage box.

* * * * *